(12) United States Patent
Wright et al.

(10) Patent No.: US 9,067,595 B2
(45) Date of Patent: Jun. 30, 2015

(54) HYBRID VEHICLE CONTROL WHEN TOWING

(71) Applicant: Ford Global Technologies, LLC, Dearborn, MI (US)

(72) Inventors: Robert Wright, Royal Oak, MI (US); Bernard D. Nefcy, Novi, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/052,993

(22) Filed: Oct. 14, 2013

(65) Prior Publication Data

US 2015/0105213 A1   Apr. 16, 2015

(51) Int. Cl.
*B60W 10/06* (2006.01)
*B60W 20/00* (2006.01)

(52) U.S. Cl.
CPC ............ *B60W 20/108* (2013.01); *Y10S 903/902* (2013.01); *B60W 20/106* (2013.01); *B60K 2741/20* (2013.01); *Y10T 477/24* (2015.01)

(58) Field of Classification Search
CPC ... B60W 10/06; B60W 20/10; B60W 20/106; B60K 2741/20; Y10T 477/24
USPC .................... 477/5, 900, 183–185; 180/65.28; 701/22
See application file for complete search history.

(56) References Cited

U.S. PATENT DOCUMENTS

| 5,927,415 | A | 7/1999 | Ibaraki et al. |
|---|---|---|---|
| 7,770,675 | B2 | 8/2010 | Hayashi |
| 8,068,019 | B2 | 11/2011 | Bennie et al. |
| 2010/0252343 | A1 | 10/2010 | Hilberer |
| 2011/0136625 | A1 | 6/2011 | Yu et al. |
| 2012/0010044 | A1 | 1/2012 | Gibson et al. |
| 2013/0035839 | A1* | 2/2013 | Otanez et al. ................. 701/102 |
| 2015/0031504 | A1* | 1/2015 | Reynolds et al. ............... 477/93 |
| 2015/0046070 | A1* | 2/2015 | Awadi et al. .................. 701/112 |

FOREIGN PATENT DOCUMENTS

WO    WO2013084333 A1 *   6/2013

OTHER PUBLICATIONS http://www.porscheownersmanual.com/cayenne-owners-manual, "Porsch iManual 2011-cayenne", Nov. 16, 2012, 2 pages.

* cited by examiner

*Primary Examiner* — Roger Pang
(74) *Attorney, Agent, or Firm* — David B. Kelley; Brooks Kushman P.C.

(57) ABSTRACT

A method for controlling a hybrid vehicle having an engine includes automatically stopping the engine in response to vehicle power demand dropping below currently available electrical power while trailering, and automatically starting the engine when vehicle power demand is at a first offset below currently available electrical power. A hybrid vehicle includes an engine, an electric machine, a trailer hitch, and a controller configured to, in response to the vehicle trailering, command the engine to start at a torque offset below an unladen vehicle engine torque pull up schedule, where the torque offset is based on vehicle loading. A method for controlling a hybrid vehicle having a trailer hitch includes detecting the trailer hitch being in use, commanding an engine to stop, and commanding the engine to start in response to a torque to accelerate being within a predetermined offset below an unladen vehicle torque pull up schedule.

8 Claims, 4 Drawing Sheets

HYBRID VEHICLE CONTROL WHEN TOWING

TECHNICAL FIELD

Various embodiments relate to a hybrid vehicle and control of the vehicle while the vehicle is towing.

BACKGROUND

Hybrid vehicles may have first and second prime movers, such as an internal combustion engine, and an electric machine. The vehicle may operate using either prime mover, or using both simultaneously. The vehicle may operate electrically depending on the amount of available electrical power and the vehicle loads, including driver demand and other vehicle accessory loads. When the battery state of charge reaches a lower limit, the engine may be started to provide additional power to the vehicle. The engine may also be started when the power or torque requirement of the vehicle will exceed that available from the electric machine.

The hybrid vehicle may be equipped with a towing package. A towing package includes a trailer hitch and a trailer light electrical connection. When a load, such as a trailer, is connected to the trailer hitch of the hybrid vehicle, the added load on the vehicle caused by pulling the trailer may exceed the electrical capability of the electric machine, and require the engine to be operating. A delay associated with starting or restarting the engine, or pulling up the engine, during vehicle operation may cause driveline disturbances, or may not meet vehicle drivability expectations.

SUMMARY

According to an embodiment, a method for controlling a hybrid vehicle having an engine is provided. The engine is automatically stopped in response to vehicle power demand dropping below currently available electrical power while trailering. The engine is automatically started when vehicle power demand is at a first offset below currently available electrical power to reduce a time delay for starting the engine and increase a currently available vehicle power to move the vehicle and trailer. The first offset is greater than a second offset for an unloaded vehicle.

According to another embodiment, a hybrid vehicle is provided with an engine, an electric machine, a trailer hitch, and a controller. The controller is configured to, in response to the vehicle trailering, command the engine to start at a torque offset below an engine torque pull up schedule for an unladen vehicle, the torque offset based on vehicle loading.

According to yet another embodiment, a method for controlling a hybrid vehicle having a trailer hitch is provided. The method detects the trailer hitch being in use. An engine is commanded to stop to increase fuel efficiency. In response to a torque to accelerate the vehicle being within a predetermined offset below an engine torque pull up schedule for an unladen vehicle, the engine is commanded to start to reduce a time delay for starting the engine and increase vehicle torque to move the vehicle.

Various embodiments have associated, non-limiting advantages. For example, to increase fuel efficiency and user expectation of a hybrid vehicle, the vehicle may be operated in an electric only mode with the electric machine propelling the vehicle and the engine off even when the vehicle is towing. When the vehicle is towing, especially for a heavier load such as a 5000 pound, 10,000 pound, or heavier trailer, the electric machine may have a reduced ability to accelerate and propel the vehicle and trailer due to the added weight of the trailer. Instead of disabling an electric only mode, as has been done in the prior art, the present disclosure allows the vehicle to operate electrically depending on the vehicle demand. The present disclosure provides a vehicle where the engine may be shut down while the vehicle is operating and vehicle demand may be met electrically in order to conserve fuel and meet user expectations. The engine may be pulled up in advance of a typical vehicle pull up schedule in order to anticipate and meet user demand and vehicle demand with the added weight of a trailer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
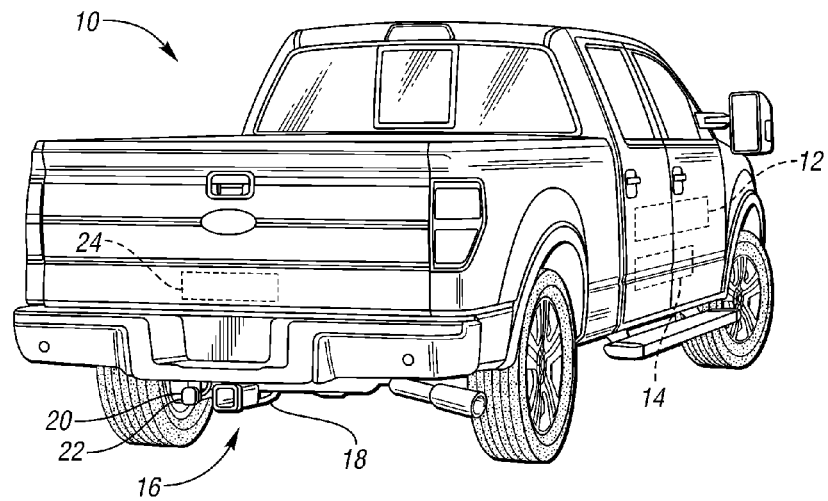
FIG. 1 is a perspective view of a hybrid vehicle according to an embodiment.

FIG. 1 illustrates a hybrid vehicle 10 according to an embodiment. The vehicle 10 is illustrated as a pick-up truck; however, other vehicle styles are also contemplated for use with the present disclosure. The vehicle 10 has a first prime mover 12, and a second prime mover 14. The first prime mover 12 may be an internal combustion engine. The second prime mover 14 may be an electric machine, such as a motor/generator. The first prime mover 12 and/or the second prime mover 14 may be used to propel the vehicle.

The vehicle 10 has a towing package 16. The towing package 16 has a tow bar 18. The tow bar 18 may include a hitch receiver (as shown), where the receiver may receive various ball mounts, and various ball sizes. Alternatively, the tow bar 18 may be a fixed drawbar with an integrated ball mount. The tow bar 18 is connected to the vehicle chassis (not shown). The tow bar 18 may be one designed for use with various classes of hitches, such as Class I, Class II, Class III, or Class IV, or others as are known in the art. The ball connected to the ball mount may be according to various standard ball sizes, such as a two inch ball, a 50 mm ball, or others as are known in the art. Alternatively, the hitch could receive other loads for transport, such as a bicycle rack, a storage box, a scooter lift, and the like.

The towing package 16 has an electrical connector 20. The electrical connector 20 provides a signal to operate the trailer lights, including brake lights, turn signal lights, emergency lights, or the like. The towing package 16 may also have a trailer brake connector 22, such that when a trailer equipped with brakes is connected, the trailer brakes may be remotely controlled. The vehicle 10 may also be equipped with a load leveling system 24, where the suspension and weight distribution between axles may be adjusted based on the tongue weight of a trailer connected to the towing package 16.

Figure 2:
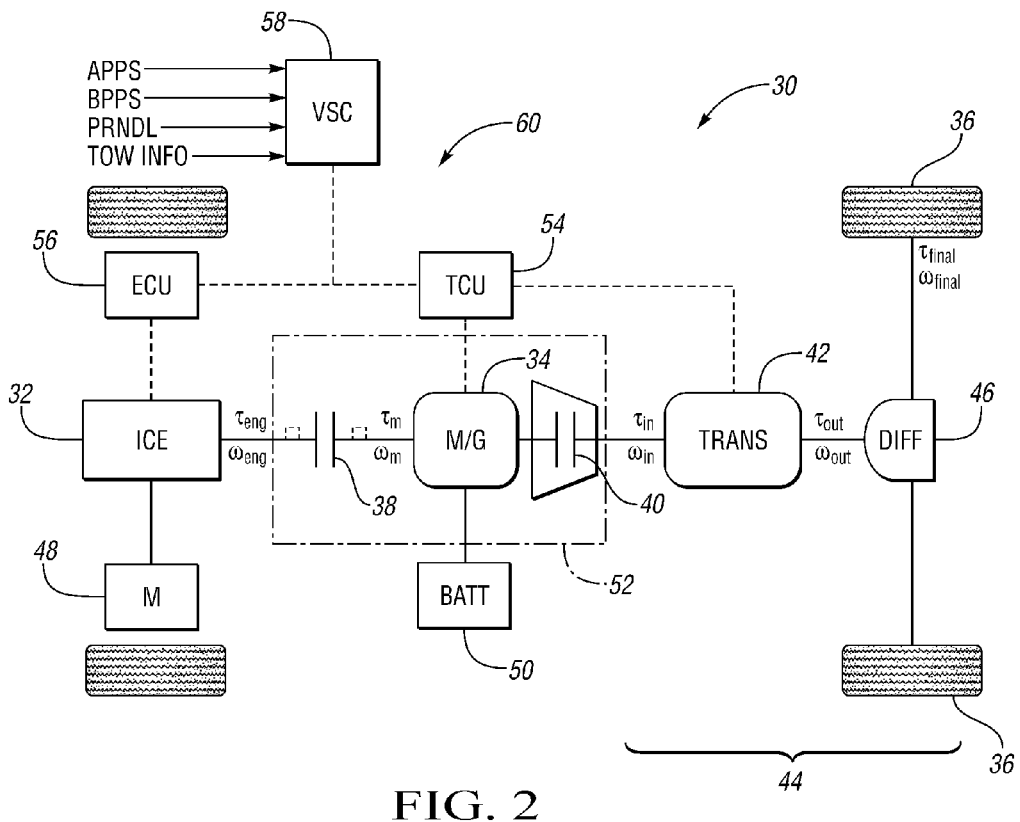
FIG. 2 is a schematic of the hybrid vehicle of FIG. 1.

FIG. 2 illustrates a schematic diagram of a hybrid vehicle 30 according to an embodiment. The vehicle 30 may be used with a towing package 16 as shown in FIG. 1. The vehicle 30 includes an engine 32, and an electric machine, which, in the embodiment shown in FIG. 2, is a motor generator (M/G) 34, and alternatively may be a traction motor. The M/G 34 is configured to transfer torque to the engine 32 or to the vehicle wheels 36.

The M/G 34 is connected to the engine 32 using a first clutch 38, also known as a disconnect clutch or the upstream clutch. A second clutch 40, also known as a launch clutch or the downstream clutch, connects the M/G 34 to a transmission 42, and all of the input torque to the transmission 42 flows through the launch clutch 40. Although the clutches 38, 40 are described and illustrated as hydraulic clutches, other types of clutches, such as electromechanical clutches may also be used. Alternatively, the clutch 40 may be replaced with a torque converter having a bypass clutch, as described further below. In different embodiments, the downstream clutch 40 refers to various coupling devices for the vehicle 30 including a traditional clutch, and a torque converter having a bypass (lock-out) clutch. This configuration may use an otherwise conventional automatic step-ratio transmission with a torque converter and is sometimes referred to as a modular hybrid transmission configuration.

The engine 32 output shaft is connected to the disconnect clutch 38, which in turn is connected to the input shaft for the M/G 34. The M/G 34 output shaft is connected to the launch clutch 40, which in turn is connected to the transmission 42. The various components of the vehicle 30 are positioned sequentially in series with one another. The launch clutch 40 connects the vehicle prime movers to the driveline 44, which includes the transmission 42, differential 46, and vehicle wheels 36, and their interconnecting components.

In another embodiment of the vehicle 30, the downstream clutch 40 is a bypass clutch with a torque converter. The input from the M/G 34 is the impeller side of the torque converter, and the output from the torque converter to the transmission 42 is the turbine side. The torque converter 40 transfers torque using its fluid coupling, and torque multiplication may occur depending on the amount of slip between the impeller and turbine sides. The bypass or lock-up clutch for the torque converter may be selectively engaged to create a mechanical or frictional connection between the impeller side and the turbine side for direct torque transfer. The bypass clutch may be slipped and/or opened to control the amount of torque transferred through the torque converter. The torque converter may also include a mechanical lockup clutch.

In the representative embodiment illustrated, the engine 32 is a direct injection engine. Alternatively, the engine 32 may be another type of engine or prime mover, such as a port injection engine or fuel cell, or use various fuel sources, such as diesel, biofuel, natural gas, hydrogen, or the like. In some embodiments, the vehicle 30 also includes a starter motor 48 operatively connected to the engine 32, for example, through a belt or gear drive. The starter motor 48 may be used to provide torque to start the engine 32 without the addition of torque from the M/G 34, such as for a cold start, some high speed starting events, or engine starts under towing load.

The M/G 34 is in communication with a battery 50. The battery 50 may be a high voltage battery. The M/G 34 may be configured to charge the battery 50 in a regeneration mode, for example when vehicle power output exceeds driver demand, through regenerative braking, or the like. The M/G 34 may also be placed in a generator configuration to moderate the amount of engine 32 torque provided to the driveline 44. In one example the battery 50 is configured to connect to an external electric grid, such as for a plug-in hybrid electric vehicle (PHEV) with the capability to recharge the battery from an electric power grid, which supplies energy to an electrical outlet at a charging station. A low voltage battery may also be present to provide power to the starter motor or other vehicle components, or low voltage power may be provided through a DC to DC converter connected to the battery 50.

In some embodiments, the transmission 42 is an automatic transmission and connected to the drive wheels 36 in a conventional manner, and may include a differential 46. The transmission 42 may be a step ratio transmission. In other embodiments, the vehicle may have other transmissions, including, continuously variable transmissions, manual transmissions, and the like. The vehicle 30 is also provided with a pair of non-driven wheels, however, in alternative embodiments, a transfer case and a second differential can be utilized to positively drive all of the vehicle wheels.

The M/G 34 and the clutches 38, 40 may be located within a motor generator case 52, which may be incorporated into the transmission 42 case, or alternatively, is a separate case within the vehicle 30. The transmission 42 has a gear box to provide various gearing ratios for the vehicle 30. The transmission 42 gearbox may include clutches and planetary gearsets, or other arrangements of clutches and gear trains as are known in the art. In alternative embodiments, the transmission 42 is a continuously variable transmission or automated mechanical transmission. The transmission 42 may be an automatic six speed transmission, other speed automatic transmission, or other gearbox as is known in the art.

The transmission 42 is controlled using a transmission control unit (TCU) 54 or the like to operate on a shift schedule, such as a production shift schedule, that connects and disconnects elements within the gear box to control the gear ratio between the transmission output and transmission input. The TCU 54 also acts to control the M/G 34, the clutches 38, 40, and any other components within the motor generator case 52.

An engine control unit (ECU) 56 is configured to control the operation of the engine 32. A vehicle system controller (VSC) 58 transfers data between the TCU 54 and ECU 56 and is also in communication with various vehicle sensors. The control system 60 for the vehicle 30 may include any number of controllers, and may be integrated into a single controller, or have various modules. Some or all of the controllers may be connected by a controller area network (CAN) or other system. The control system 60 may be configured to control operation of the various components of the transmission 42, the motor generator assembly 52, the starter motor 48 and the engine 32 under any of a number of different conditions, including in a way that minimizes a delay in power delivered by the vehicle in response to a user request when the vehicle is towing due to a time associated with an engine pull up sequence.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Under normal powertrain conditions (no subsystems/components faulted), the VSC 58 interprets the driver's demands (e.g. PRND and acceleration or deceleration demand), and then determines the wheel torque command based on the driver demand and powertrain limits. In addition, the VSC 58 determines when and how much power or torque each power source needs to provide in order to meet the driver demand and/or vehicle demand and to achieve the operating points (torque and speed) of the engine 32 and M/G 34.

The VSC 58 selects the power and torque delivery mode based on the vehicle operating conditions and a predefined strategy. To this end, the VSC 58 receives a signal from a transmission range selector (PRND), an accelerator pedal position sensor output (APPS), and a brake pedal position sensor output (BPPS).

In alternative embodiments, the clutch 40 may be replaced with a torque converter unit including a torque converter and a lockup clutch or bypass clutch. The torque converter has torque multiplication effects when certain rotational speed differentials exist across the torque converter. During torque multiplication, the output torque of the torque converter is larger than that of the input torque due to torque multiplication across the torque converter. Torque multiplication exists for example, when the vehicle 30 is started from rest and the input shaft to the torque converter begins to rotate, and the output shaft from the torque converter is still at rest or has just begun to rotate.

The lockup clutch or bypass clutch is used to lock out the torque converter such that the input and output torques for the downstream torque transfer device 40 are equal to one another, and the input and output rotational speeds for the device 40 are equal to one another. A locked clutch eliminates slipping and driveline inefficiency across the torque converter, for example, when the rotational speed ratio across the torque converter is greater than approximately 0.8, and may increase fuel efficiency for the vehicle 30.

In other embodiments, the method described herein may be applied to hybrid vehicle having other system architectures. In one example, a powersplit vehicle architecture may be used. An example of a powersplit hybrid vehicle is described in U.S. Pat. No. 6,994,360, issued on Feb. 7, 2006, the contents of which are incorporated by reference in their entirety herein.

For the vehicle 30, the engine 32 may be pulled up, or started for a number of reasons. The engine 32 may be started when the vehicle power demand approaches or exceeds the available electrical power that may be provided by the electric machine and the battery at that time. For example, the amount of electrical energy and power available may vary based on a battery state of charge, a maximum discharge rate of the battery, the power, speed, and torque limits of the electric machine, and the like.

The vehicle power demand may include driver demand, such as from a tip in request, and other accessory vehicle loads, including cabin conditioning systems, exterior lights, and the like.

The engine 32 may be started when the vehicle torque demand approaches or exceeds the available electrical torque that may be provided by the electric machine and the battery at that time. The available electrical torque may depend on the battery state, and the torque limit of the electric machine.

Other reasons for an engine pull up request include a battery state of charge reaching a minimum threshold value, a scheduled catalyst aftertreatment regeneration process, and the like.

Figure 3:
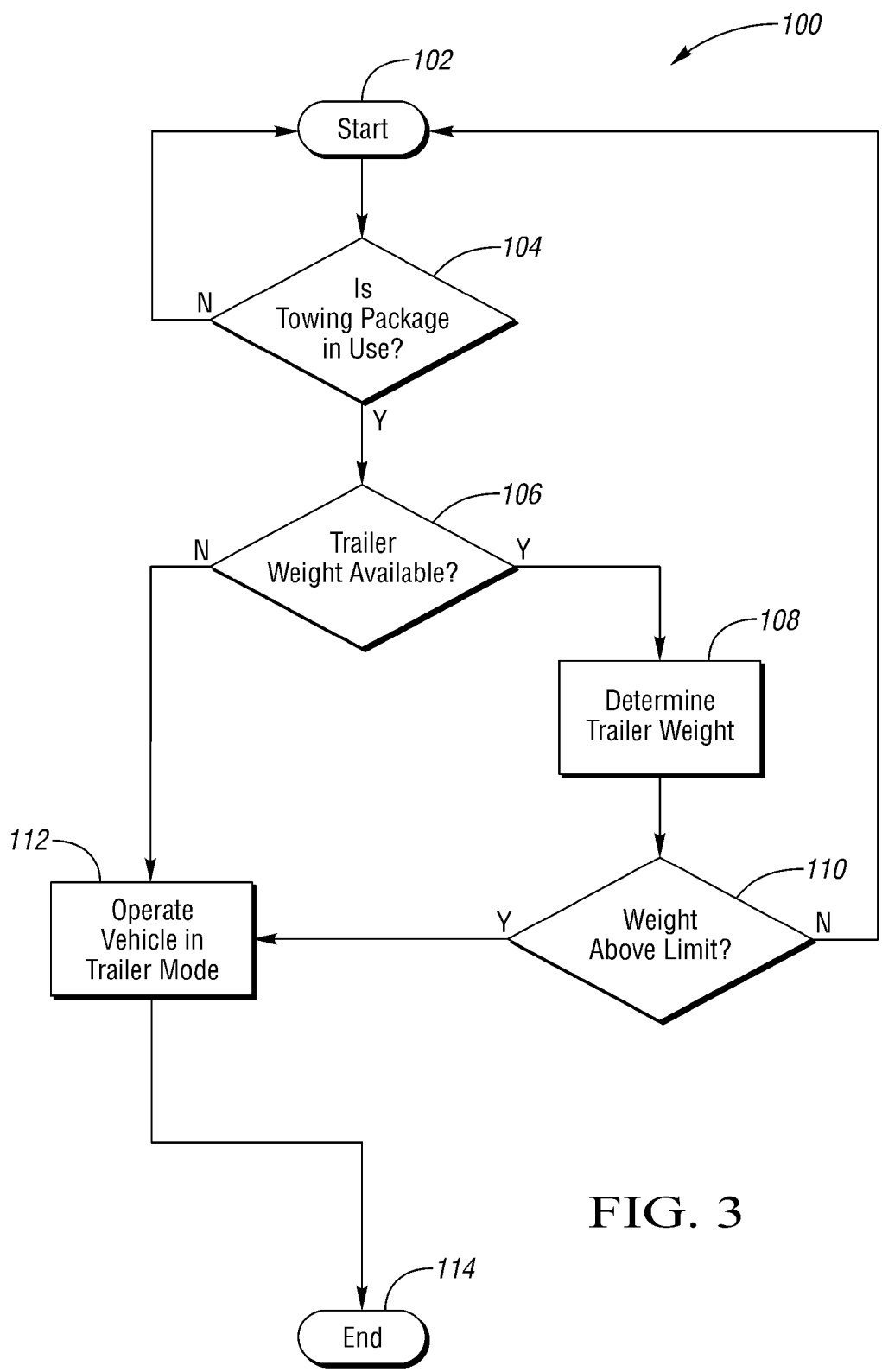
FIG. 3 is a flow chart illustrating a method of controlling a hybrid vehicle according to an embodiment.

FIG. 3 illustrates a flowchart describing a method 100 for use in controlling a hybrid vehicle according to an embodiment. In other embodiments, the method 100 may include a greater or fewer number of steps, and various steps may be performed sequentially or in parallel with one another. The steps in the method may also be ordered differently from the illustrated method in other embodiments.

The method 100 begins at 102 and proceeds to block 104 where it determines if the towing package for the vehicle is in use. The towing package may be determined to be in use based on an input to the control system indicated that the electrical connector for the towing package is connected, a load leveling system is activated, and/or sensors in the hitch receiver detect an attached load. If the towing package is not in use, the method 100 returns to block 102. If the towing package is in use at 104, the method 100 proceeds to block 106.

At block 106, the method 100 determines if the trailer weight is available. If the trailer weight is available, the method 100 proceeds to block 108 where it determines the weight. The weight may be determined using various methods as are known in the art. An example of a method to determine trailer weight is described herein with reference to FIG. 6. The trailer weight may also be determined based on a user input, for example, through a user interface in the vehicle, where the user inputs the weight of the trailer as determined by the user.

The method 100 then proceeds to block 110, where it determines if the trailer weight is above a threshold value. For example, the threshold value may be 3000 pounds, 5000 pounds, 10000 pounds, or any other value. The threshold value may be based on the vehicle electrical limits, the towing capability of the vehicle, and other relevant factors.

If the trailer weight does not exceed the threshold value at 110, the method 100 returns to the start 102 and operates the vehicle normally, or operates the vehicle as if no trailer was present.

If the trailer weight is above the threshold value at 110 or if the trailer weight in unknown at 106, the method 100 proceeds to block 112. At 112, the method 100 causes the vehicle to be operated in a trailer mode. The trailer mode may be set differently for different known trailer weights over the threshold value, and for different vehicle hybrid architectures.

In one embodiment, the method 100 causes the controller to command the engine to stop in response to vehicle power demand being less than a currently available electrical power. The method 100 also causes the controller to command the engine to start while vehicle demand is less than the currently available electrical power to reduce a time delay for starting the engine and increase a currently available vehicle power to move the vehicle and trailer.

The engine may be started before an accelerator pedal is actuated. For example, if a vehicle is approaching a stop, such as a traffic light, or the vehicle is placed into a park gear, the engine may be stopped to conserve fuel if the vehicle demand from accessory loads may be met electronically. The engine may be restarted in response to a release of a brake pedal or shifting the vehicle out of park, with the release determined using the BPPS or the gear shift lever, in anticipation of the user engaging the accelerator pedal with a tip in request. This essentially disables electric creep for the vehicle, as the engine is started as the brake pedal is released and is therefore available to cause vehicle creep. The tip in request may exceed the electric machine capability to accelerate the vehicle with a trailer attached, and so the engine is pulled up to meet a potential user request.

The engine may be stopped when the controller receives a braking request from the BPPS, which would indicate that the driver demand is below road load for the vehicle, for example, when driving downhill. The engine may be pulled up or restarted as the brake pedal is released in anticipation of a tip in request at the accelerator pedal and the need for at least the engine to accelerate the vehicle.

The engine may be commanded to start by the controller when vehicle power demand is at a first offset below the currently available electrical power. Vehicle power demand may include multiple power demands in the vehicle, including user requested power from a tip in request, and power demands from vehicle accessory loads. The currently available electrical power is the maximum power output from the electric machine at that time, and may vary based on the battery state and the electric machine operating state.

The engine may be pulled up for a vehicle without a load attached to the towing package when the vehicle demand is at a second offset below the currently available electrical power. The second offset is less than the first offset such that there is a larger power delta between a scheduled engine pull up for a vehicle with a trailer than a vehicle without a trailer. In other words, the engine is pulled up sooner when the vehicle has a load connected to the towing package based on the same currently available electrical power. The engine is pulled up sooner because the currently available electrical power may not be able to meet the same vehicle demand and accelerate the vehicle depending on the trailer weight. The engine is also pulled up sooner to meet user expectations such that when the user tips in, the engine is operating to provide power to accelerate the vehicle. The engine does not operate when the vehicle is towing and demand is below the first offset such that vehicle demand is met by the electric machine and user expectations of electric only operation for a hybrid vehicle may be met, and to conserve fuel and increase fuel economy for the vehicle.

The second offset may be implemented as a modification of the first offset. The second offset may be calculated or determined based on the weight of the trailer, if known. The first and/or the second offsets may be predetermined and provided to the vehicle controller as a calibration table, or may be calculated in real time as the vehicle operates.

In another embodiment, the vehicle controller commands the engine to start at a torque offset below an unloaded vehicle engine torque pull up schedule at 112. The controller may command the engine to start based on engine torque pull up schedule for an unloaded vehicle when the torque request for the engine reaches a specified value in the schedule. The engine torque pull up schedule may be a calibration table referenced by the controller. The torque offset may be based on the weight of the load connected to the towing package of the vehicle, such that a larger torque offset occurs for a heavier trailer load. In other embodiments, the torque offset may be a fixed value, for example, the offset may be based on a maximum trailer weight for the vehicle.

The controller may command the engine to stop when the torque request is below the torque offset of the engine torque pull up schedule, thereby conserving fuel.

For the engine stop and start commands, there may be a filter used with the pull up schedules to reduce hysteresis and the engine cycling on and off based on a torque or power demand fluctuating near the offset value for pull up.

Of course, torque, power, and speed are related to one another. If two of the three values are known, the third may be calculated. Power is the product of torque times rotational speed. Therefore, the engine power is the engine torque times the engine output shaft speed. The electric machine power is the electric machine torque output times the rotational speed of the electric machine output shaft. The power at the vehicle wheels is the torque at the wheels times the rotational speed of the wheels. Torque and power, as used in the examples herein, may be interchanged using rotational speed as the simple conversion between the two.

At 112, the vehicle controller may also command a downstream clutch 40 (or torque converter) to slip at vehicle launch. By slipping the downstream clutch 40, vehicle power production may be increased as the engine speed is permitted to increase. Alternatively, vehicle acceleration may be increased by slipping the downstream clutch 40.

For a vehicle 30, the controller may disable a locked torque converter 40 for a vehicle launch. By slipping the torque converter 40, the resulting torque multiplication across the torque converter results in a greater torque at the wheels to accelerate and propel the vehicle and trailer.

From 112, the method 100 proceeds to block 114 and ends.

Figure 4:
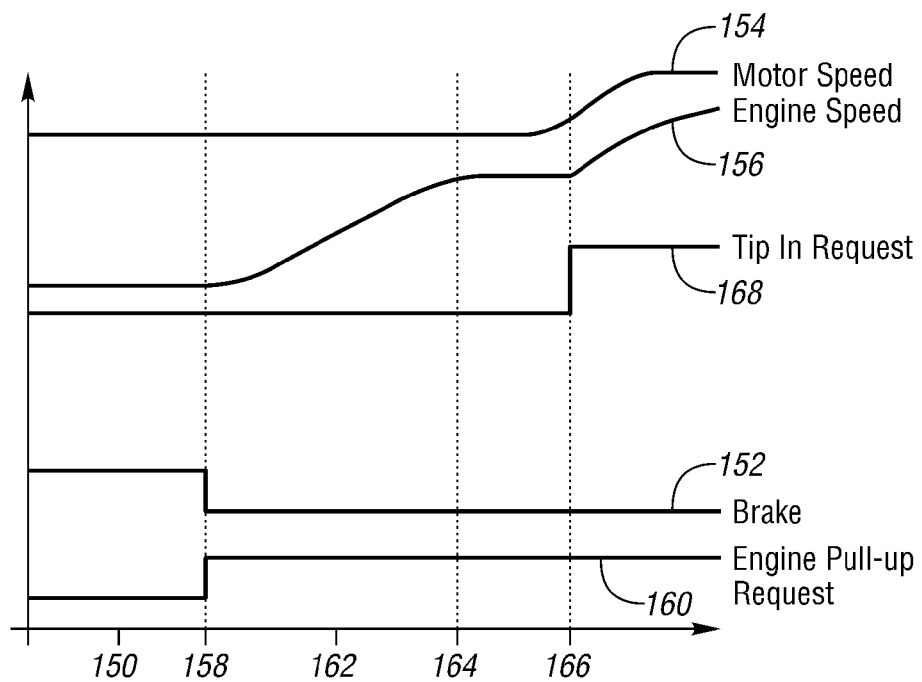
FIG. 4 is a timing chart for the hybrid vehicle according to an embodiment.

FIG. 4 illustrates a timing chart for a hybrid vehicle according to the present disclosure. The hybrid vehicle has a load attached to the towing package such that the vehicle is trailering. The controller caused the vehicle to enter the trailer mode based on the trailer weight. The vehicle is at rest in zone 150. The user has the brake pedal depressed as shown by the brake input 152. The electric machine, as shown by the electric machine speed 154, is at rest. The engine, as shown by the engine speed 156, is also at rest. At time 158, the user begins to release the brake pedal 152. The controller then requests an engine pull up, as shown by engine command 160.

In zone 162, the engine speed 156 increases as the engine is pulled up. At time 164, the engine is operating at idle speed, and the brake pedal and accelerator pedal are not engaged. The vehicle may be creeping at this point.

At time 166, the user provides a tip in request 168 to the accelerator pedal. The engine speed and electric machine speed (and torque and power) increase to meet the user and vehicle demand. By starting the engine as the brake pedal is released, the engine is operational as soon as the accelerator pedal is engaged and there is no delay in vehicle acceleration and response due to an engine start sequence.

Figure 5:
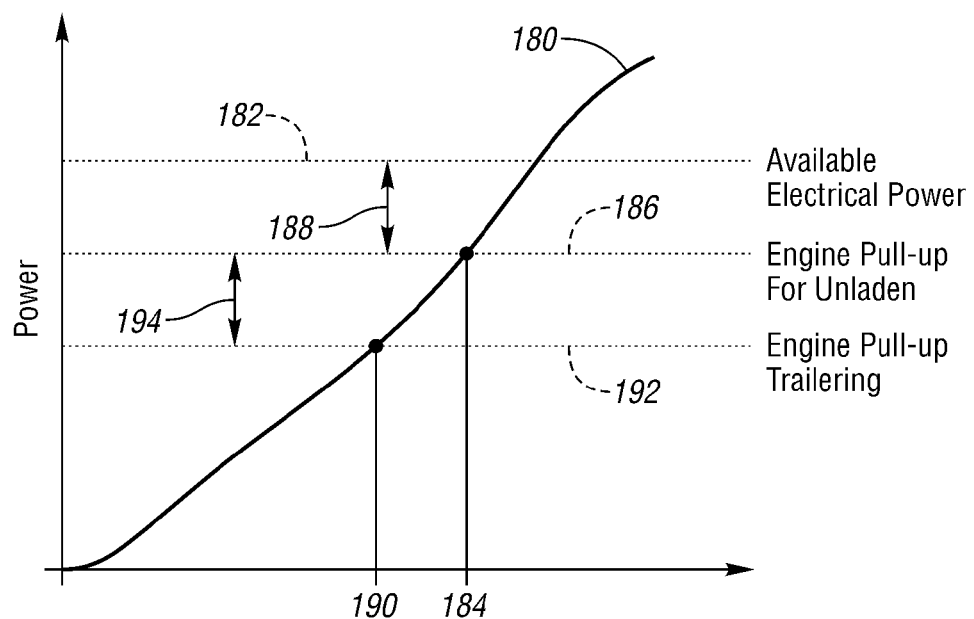
FIG. 5 is a chart illustrating engine pull up based on vehicle power for the hybrid vehicle according to an embodiment.

FIG. 5 illustrates a chart for engine pull up based on vehicle power for a hybrid vehicle according to an embodiment. The requested or demanded vehicle power is shown at 180. The maximum available electrical power is illustrated at 182. The maximum available electrical power may be determined using the battery state of charge, the vehicle speed, the operating state of the electric machine, and other vehicle inputs. Multiple charts or tables may provide maximum electrical power and varying trailer loads.

The engine may be scheduled to be pulled up at 184, when the vehicle demand reaches a threshold 186 that corresponds to an engine pull up for a vehicle with no load connected to the towing package, or a load below the weight threshold. Threshold 186 is at an offset 188 below the maximum available electrical power 182 to provide a reserve or buffer region.

When the hybrid vehicle has a load attached to the towing package such that the vehicle is trailering, the controller caused the vehicle to enter the trailer mode based on the trailer weight. In the trailer mode, the controller commands an engine pull up at 190 when the vehicle demand reaches a threshold 192 that corresponds to an engine pull up for a vehicle with a load connected to the towing package, which may be a load above the weight threshold. Threshold 192 is at an offset 194 below the threshold 186 to provide an additional reserve or buffer region such that the engine is operating when a vehicle power demand is received to provide the requested power. The offset 194 may vary based on the weight of the trailer, and may increase in value as the weight increases.

Note that although the maximum available electrical energy may be the same between a vehicle that is trailering and one that is unladen, a larger portion of the electrical energy may be used with the trailering vehicle to meet the same vehicle demand. For example, based on the vehicle state and maximum available electrical energy, an unladen vehicle may be able to operate electrically up to 75% wide open throttle. The same vehicle having the same vehicle states, but with an attached trailer, may only be able to operate electrically up to 60% wide open throttle.

A similar schematic as FIG. 5 may be provided with torque replacing power, and having an offset between torque for engine pull up for an unladen vehicle and a vehicle towing a trailer. The engine pull up torque threshold for a vehicle towing a trailer is less than the engine pull up torque threshold for an unladen vehicle. The offset between the pull up torque thresholds may be based on the weight of the trailer, such that the offset increases as the trailer weight increases.

Figure 6:
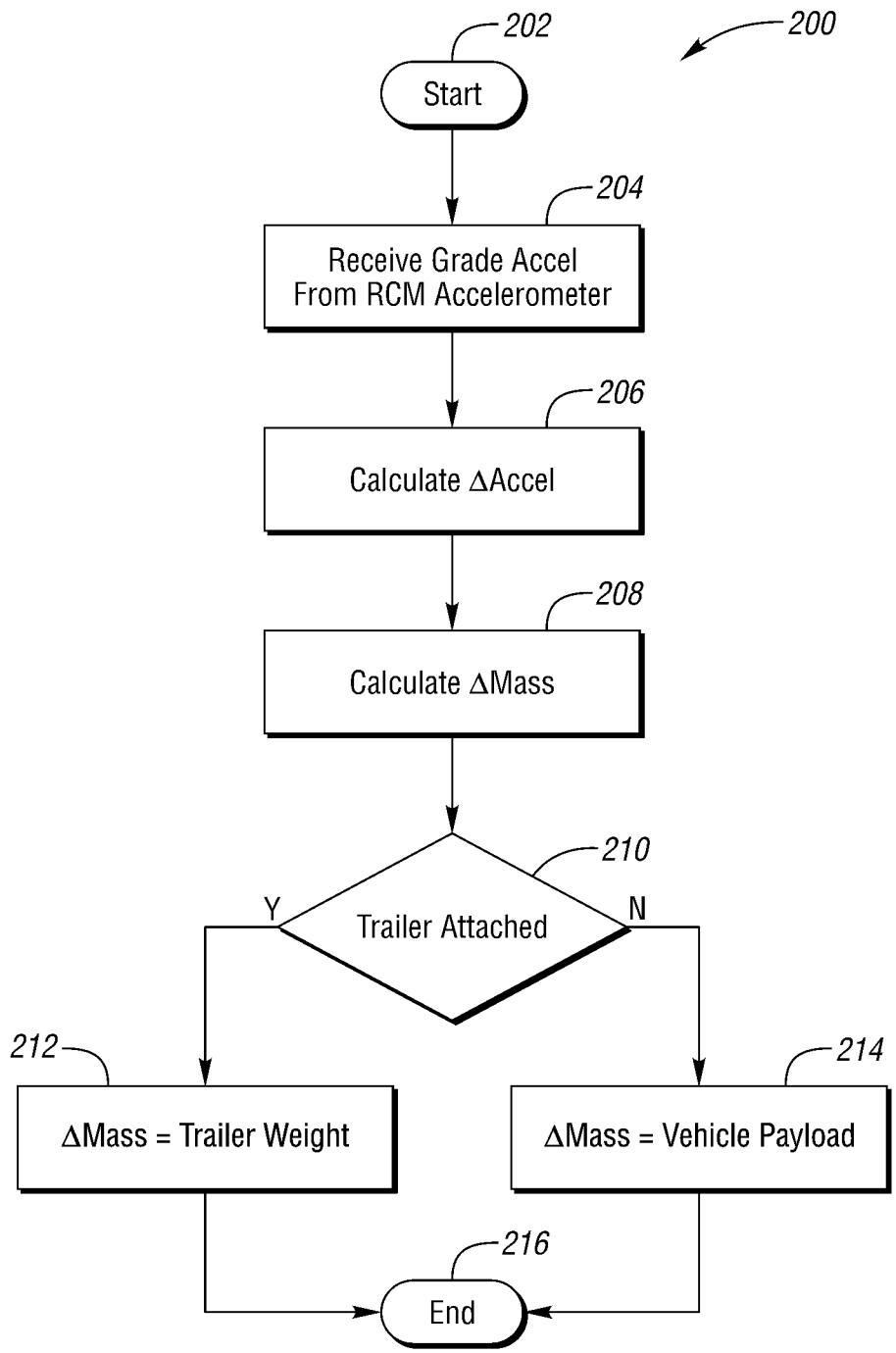
FIG. 6 is a flow chart illustrating a method of determining a load connected to a trailer hitch of a vehicle according to an embodiment.

FIG. 6 is a flowchart of a method 200 to determine a trailer weight for use with the method 100 shown in FIG. 3 according to an embodiment. The method 200 may be used at step 108 in method 100 for example. The method 200 starts at 202, and proceeds to block 204 where the controller receives the actual grade based acceleration of the vehicle from the road condition monitoring accelerometer, or the like.

The method 200 then calculates the change in acceleration (Δaccel) at 206. The grade based acceleration is added to an expected level ground acceleration, or a zero grade acceleration and this total is then subtracted from the actual vehicle acceleration to provide the change in acceleration.

The method 200 calculates the change in mass (Δmass) at 208. The change is mass is calculated using Newton's second law, or Δmass=F/Δaccel, and assuming that any change in acceleration is due to the change in mass. The force, F, that is used is based on the torque at the wheels and the radius of the wheel assembly. The mass is scaled by a percent difference in the acceleration, and the base mass is then subtracted to calculate Δmass.

At 210, the method 200 determines if a trailer is attached, using input from block 104 in method 100, for example. If a trailer is attached, the method 200 proceeds to block 212 and the controller sets the trailer weight as equal to Δmass. If there is no trailer attached, the method 200 proceeds to block 214 and the controller sets the vehicle payload as equal to Δmass. The method then goes to block 216 from either 212 or 214 and ends.

As such, various embodiments according to the present disclosure provide for increased fuel efficiency and user expectations of a hybrid vehicle towing a load or a trailer. The vehicle may be operated in an electric only mode with the electric machine propelling the vehicle and the engine off even when the vehicle is towing. When the vehicle is towing, especially for a heavier load such as a 5000 pound, 10,000 pound, or heavier trailer, the electric machine may have a reduced ability to accelerate and propel the vehicle and trailer due to the added weight of the trailer. Instead of disabling an electric only mode, as has been done in the prior art, the present disclosure allows the vehicle to operate electrically depending on the vehicle demand. The present disclosure provides a vehicle where the engine may be shut down while the vehicle is operating and vehicle demand may be met electrically in order to conserve fuel and meet user expectations. The engine may be pulled up in advance of a typical vehicle pull up schedule in order to anticipate and meet user demand and vehicle demand with the added weight of a trailer.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a hybrid vehicle comprising:
   automatically stopping an engine in response to vehicle power demand (D) dropping below currently available electrical power (EP) while trailering; and
   automatically starting the engine to reduce an engine starting time delay and increase a currently available vehicle power to move the vehicle and trailer when D is at a first offset below EP, the first offset being greater than a second offset for an unloaded vehicle.

2. The method of claim 1 wherein the engine is started before an accelerator pedal is actuated.

3. The method of claim 1 further comprising automatically starting the engine in response to a brake pedal release to reduce the engine starting time delay and increase the currently available vehicle power to move the vehicle and trailer.

4. The method of claim 1 wherein the engine is stopped in response to receiving a braking request indicating D is less than a road load.

5. The method of claim 1 wherein the first offset is selected to disable electric creep.

6. The method of claim 1 further comprising calculating a weight of a trailer based on a comparison between actual vehicle acceleration and expected vehicle acceleration.

7. The method of claim 1 further comprising detecting a load connected to a trailer hitch of the vehicle to determine that the vehicle is trailering.

8. The method of claim 1 wherein the first offset is based on a weight of a trailer.

* * * * *